United States Patent [19]
Arnold

[11] Patent Number: 5,152,627
[45] Date of Patent: Oct. 6, 1992

[54] TELESCOPABLE STEERING COLUMN OF POWER VEHICLE

[75] Inventor: Hans Arnold, Lage, Fed. Rep. of Germany

[73] Assignee: Reiche & Co., Lage, Fed. Rep. of Germany

[21] Appl. No.: 649,653

[22] Filed: Feb. 1, 1991

[30] Foreign Application Priority Data

Mar. 16, 1990 [DE] Fed. Rep. of Germany ....... 4008481

[51] Int. Cl.⁵ .............................. F16B 7/10; B62D 1/18
[52] U.S. Cl. .............................. 403/109; 403/351/367; 74/493
[58] Field of Search ............... 403/108, 109, 369, 367, 403/314, 351, 352, 383; 74/493; 280/775

[56] References Cited

U.S. PATENT DOCUMENTS

| | | | |
|---|---|---|---|
| 1,852,785 | 4/1932 | Moehler | 403/109 |
| 3,318,170 | 5/1967 | Runkle | 74/493 |
| 3,368,834 | 2/1968 | Stratienko | 403/352 |
| 3,419,293 | 12/1968 | Conrad | 403/351 |
| 3,444,753 | 5/1969 | Runkle | 403/351 X |
| 4,419,026 | 12/1983 | Leto | 403/109 X |
| 4,563,912 | 1/1986 | Parks | 74/493 |
| 4,585,367 | 4/1986 | Gall | 403/367 X |
| 4,911,034 | 3/1990 | Kukzyk et al. | 74/493 X |
| 5,046,761 | 9/1991 | Cordes | 403/108 X |
| 5,086,661 | 2/1992 | Hancock | 74/493 |

Primary Examiner—Peter M. Cuomo
Attorney, Agent, or Firm—Michael J. Striker

[57] ABSTRACT

A telescopable, height-adjustable steering column for power vehicles comprises an inner pipe provided with a sliding surface, an outer pipe provided with a sliding surface cooperating with the sliding surface of the inner pipe. One of the pipes is displaceable relative to the other of the pipes. An element for closing the tolerance gap between the sliding surfaces of the inner and outer pipes and includes two wedge members located between the pipes and displaceable under a spring action transversely to an axis of the steering column over two inclined planes.

13 Claims, 2 Drawing Sheets

TELESCOPABLE STEERING COLUMN OF POWER VEHICLE

BACKGROUND OF THE INVENTION

The present invention relates to a steering wheel for a power vehicle, which is formed as a telescopable pipe which is for example manually height adjustable.

More particularly, it relates to such a steering column of the above mentioned type, which has an inner pipe with at least one cast or molded sliding bush of synthetic plastic material or metal, and an outer pipe with pre-fabricated sliding surfaces.

Steering columns for power vehicles of the above mentioned general type are known in the art. One such steering column is disclosed for example in the German document DE-PS 3,202,669. In this reference the steering wheel is adjustable as to its height by a displacement force which is smaller than 100 N. In the above mentioned known steering wheel the inner pipe has a triangular cross-section and is provided with two sliding bushes in the overlapping region between the outer pipe and the inner pipe. The inner pipe is injection molded or cast with the sliding bushes in a mold. For obtaining a non-rotatable connection between the outer and inner pipes, the cylindrical outer pipe is shaped in accordance with the geometry of the sliding bushes in a partial region and fitted on the sliding bushes. For obtaining a play-free guidance of the outer and inner pipes in the region of the sliding bushes the pipe portion between the bushes is utilized and twisted as torsion bar, so that a sliding surface part of the inner pipe is pre-tensioned relative to the other part.

The pre-tensioning moment must be maintained within narrow limits. The lower limit is provided by the moment at the steering wheel, which must be transmitted in a play-free manner, and numbered in the passanger cars in the region with maximum 6 Nm. The upper limit is determined by the friction force produced by the pre-tensioning moment between the outer and the inner pipes. This value is dependent on sensation and in the manually height adjustable steering columns for power vehicles it is permitted to be maximum 120 N. Since a pre-tensioning moment of 6 Nm produced an adjusting force of approximately 85 N, lower adjusting forces in accordance with the above explained processes are not obtained. Since in the front-drive power vehicles in the case of fast straight drive short time torques due to street unevenness occur greater than 6 Nm, the play-free operation in this region is not achieved.

SUMMARY OF THE INVENTION

Accordingly, it is an object of the present invention to provide a steering wheel for power vehicles of the above mentioned general type, in which the freedom of play between the sliding surfaces of the outer pipe and the inner pipe can be achieved without using a pre-tensioning moment produced by a torsion bar.

In keeping with these objects and with others which will become apparent hereinafter, one feature of the present invention resides, briefly stated, in a steering wheel for power vehicles, which in accordance with the present invention is provided with two wedge members located between the outer pipe and the inner pipe or between the outer pipe and the sliding bush of the inner pipe, and supported displaceably in two inclined planes by means of a spring which is located between the wedge members and extends transversely to an axis of the steering wheel.

When the steering wheel is designed in accordance with the present invention, the spring-biased wedge members close the tolerance gap between the sliding surfaces of the inner and outer pipes.

Since the displacement of the wedge members is performed in unloaded condition of the steering column of the power vehicle, the spring force can be low and therefore the adjustment force of the parts of the steering wheel in the axial direction can be maintained at a low level.

In accordance with another feature of the present invention, the inclined planes can be formed as parts of the sliding bush or the inner pipe.

Still another feature of the present invention is that the inner pipe is provided with two sliding bushes arranged at a distance from one another, and the spring-loaded wedge members are arranged between the inner pipes.

In accordance with a further feature of the present invention, the inner pipe can be provided with a sliding bush which has a recess for the partial receipt of the wedge pieces, and the bottom surface of the recess is formed by the inclined surfaces.

The spring can be formed as a metal spring. Such a metal spring can have a C-shaped contour.

The ends of the C-shaped spring can engage in a wedge member composed of synthetic plastic material, and a part of the leg of the spring located opposite to the ends can be embedded in the other wedge member of synthetic plastic material.

The wedge members can be formed as die cast parts, while the spring can be formed as a steel spring.

In accordance with still another feature of the present invention the spring and the wedge pieces can be made of one piece with one another as an integral element. In this case the spring and the wedge member can be composed of synthetic plastic material.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
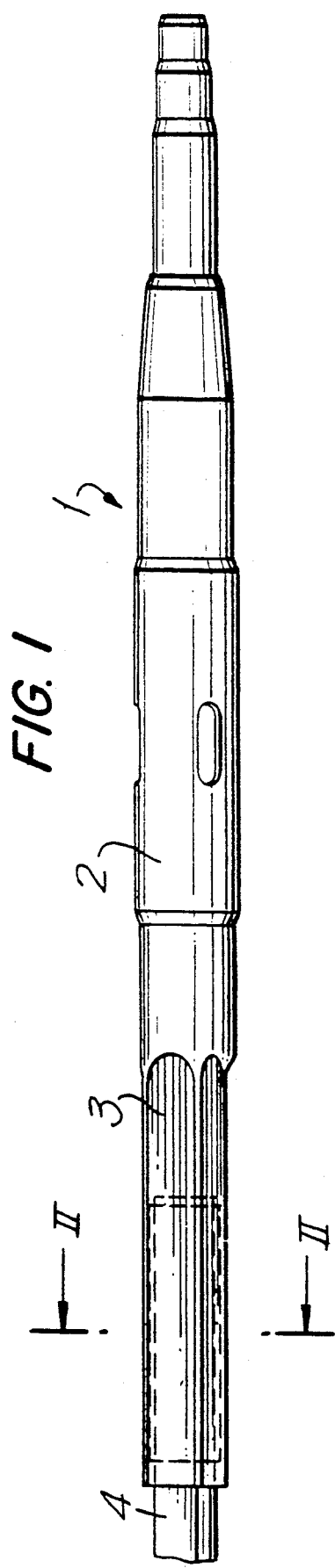
FIG. 1 is a view showing a steering column of a power vehicle which is formed as a telescopable pipe.

A steering column 1 for a power vehicle has an outer pipe identified with reference numeral 2. The outer pipe is formed cylindrically in its upper and central region and has a triangular cross-section in its lower partial region 3. The steering wheel 1 further has an inner pipe identified with reference numeral 4 and also having a triangular cross-section. The outer pipe 2 embraces the inner pipe 4 in a form-locking manner.

A sliding bush 5 is mounted in the inner pipe. The sliding bush can be composed of synthetic plastic material or metal and can be cast or molded in a mold on the inner pipe. Therefore, the outer sliding surfaces are determined as to its tolerance by a molding tool, and the tolerances and manufacturing inaccuracies of the inner pipe do not affect the tolerances of the sliding surfaces of the sliding bush.

In the embodiment shown in the drawings, the axial displacement region of the steering column 1 for the power vehicle is formed by a profile with three supporting faces.

Figure 2:
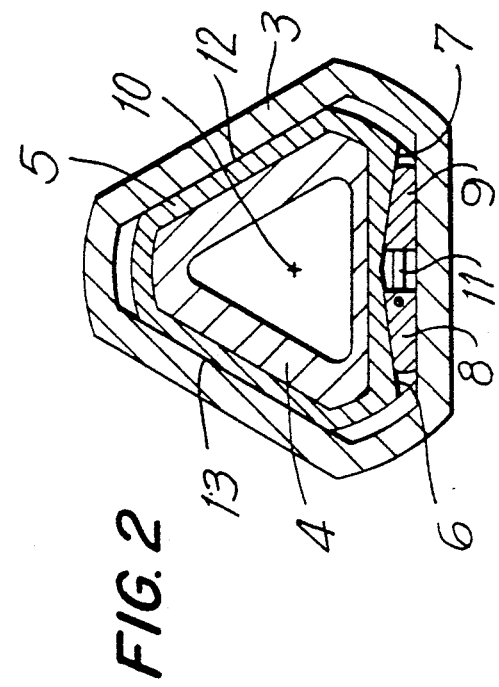
FIG. 2 is a view showing the inventive steering wheel in a section taken along the line II—II in FIG. 1.

In the embodiment shown in FIG. 2 inclined surfaces 6 and 7 are formed in one of the faces of the sliding bush 5. They are made simultaneously with bringing of the sliding bush on the inner pipe 4. Two wedge members 8 and 9 are narrowing in opposite directions and are displaceable on the inclined surfaces transversely to an axis 10 of the steering column under the action of a spring 11 supported between the wedge members. The wedge members are pressed against the associated inner surfaces of the outer pipe under the spring action and press the sliding bush 5 against sliding surfaces 12 and 13 of the outer pipe. Therefore, the sliding bush abuts against the above mentioned sliding surfaces 12 and 13 of the outer pipe in a play-free manner, and the wedge pieces take care of freedom of play relative to the remaining inner sliding surfaces of the outer pipe.

Figure 4:
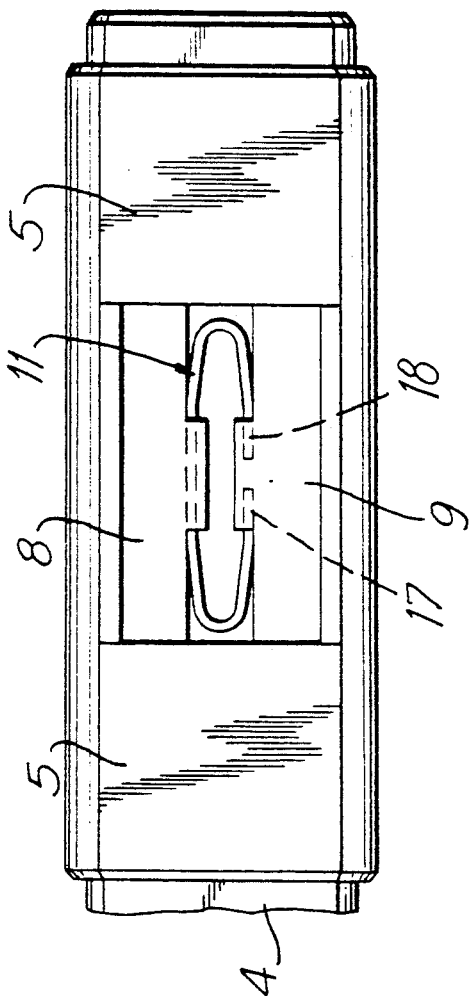
FIG. 4 is a view in direction of the arrow IV in FIG. 3 without an outer pipe.
Figure 3:
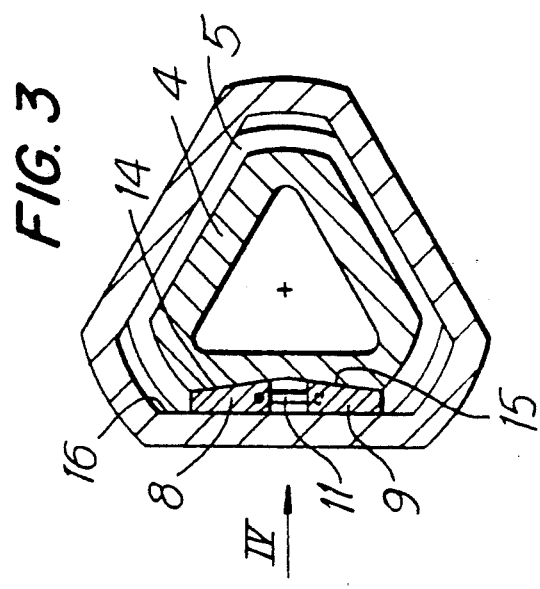
FIG. 3 is a view substantially corresponding to the view of FIG. 2, but showing another embodiment of the invention.

In the embodiment of FIGS. 3 and 4, inclined surfaces 14 and 15 are formed as surfaces of the inner pipe 4. The wedge members 8 and 9 abut against these inclined surfaces and pressed by the spring 11 against a sliding surface 16 of the outer pipe. The wedge members 8 and 9 are arranged in a recess of the sliding bush 5 or between two sliding bushes 5 located at a distance from one another.

In the embodiment shown in FIGS. 2, 3 and 4 the spring 11 is formed as a steel spring. This spring has a C-shaped contour and is provided with ends 17 and 18 engaging a wedge member 9. The wedge member 9 can be composed of synthetic plastic material. A part of the legs of the spring which are located opposite to the ends 17 and 18 is embedded in the other wedge member 8. The wedge members can be formed as die cast members.

Figure 5:
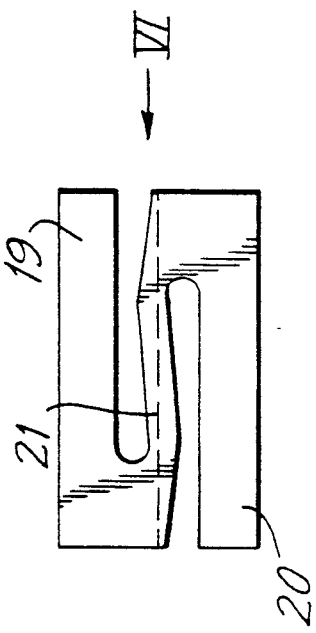
FIG. 5 is a view showing a one-piece structure of two wedge members with a spring arranged therebetween.
Figure 6:
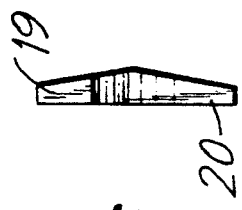
FIG. 6 is a view in the direction of the arrow VI in FIG. 5.

In the embodiment shown in FIGS. 5 and 6 wedge members 19 and 20 are formed of one piece with the spring 21 so as to form a one piece, integral element. The wedge members and the spring can be made of synthetic plastic material. It is also possible to make the wedge members and spring of one piece with one another as an integral element of metal.

It will be understood that each of the elements described above, or two or more together, may also find a useful application in other types of constructions differing from the types described above.

While the invention has been illustrated and described as embodied in a telescopable steering column for power vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A telescopable, height-adjustable steering column for power vehicles, comprising an inner pipe having a plurality of sides and provided with a sliding surface at one of said sides; an outer pipe having a plurality of sides and provided with a sliding surface at said one said and cooperating with said sliding surface of said inner pipe, one of said pipes being displaceable relative to the other of said pipes; and means for closing a tolerance gap between said sliding surfaces of said inner and outer pipes and including two wedge members located between said pipes at said one side and narrowing in opposite directions, and a spring located between said two wedge members and applying a spring action to said two wedge members to press the latter away from one another in opposite directions transversely to an axis of the steering column over two inclined planes.

2. A steering column as defined in claim 1; and further comprising a sliding bush provided on said inner pipe for forming said first mentioned sliding surface of said inner pipe, said wedge members being arranged between said outer pipe and said sliding bush.

3. A steering column as defined in claim 2, wherein said inclined planes are formed as portions of said sliding bush.

4. A steering column as defined in claim 1, wherein said wedge members are arranged directly between said outer pipe and said inner pipe.

5. A steering column as defined in claim 1, wherein said inclined planes are formed as portions of said inner pipe.

6. A steering column as defined in claim 1, wherein said inner pipe has two sliding bushes arranged at a distance from one another, said wedge members being located between said sliding bushes.

7. A steering column as defined in claim 1, wherein said inner pipe is provided with a sliding bush having a recess with a bottom surface, said wedge members being at least partially received in said recess of said sliding bush, said inclined planes being formed by said bottom surface of said recess of said sliding bush.

8. A steering column as defined in claim 1, wherein said spring is formed as a metal spring and has a C-shaped contour.

9. A steering column as defined in claim 8, wherein said spring has two ends and a leg, said ends of said spring engaging in one of said wedge members and a part of said leg of said spring which is located opposite to said ends being embedded in the other of said wedge members.

10. A steering column as defined in claim 9, wherein said wedge members are composed of synthetic plastic material.

11. A steering column as defined in claim 1, wherein said wedge members are die cast-produced members, said spring being formed as a steel spring.

12. A steering column as defined in claim 1, wherein said spring is formed one one piece with said wedge members so as to form an integral one-piece element.

13. A steering column as defined in claim 12, wherein said spring and said wedge members are composed of synthetic plastic material.

* * * * *